Dec. 29, 1953
U. S. BERGER
2,664,505
FREQUENCY MODULATION DETECTOR
Filed July 26, 1951
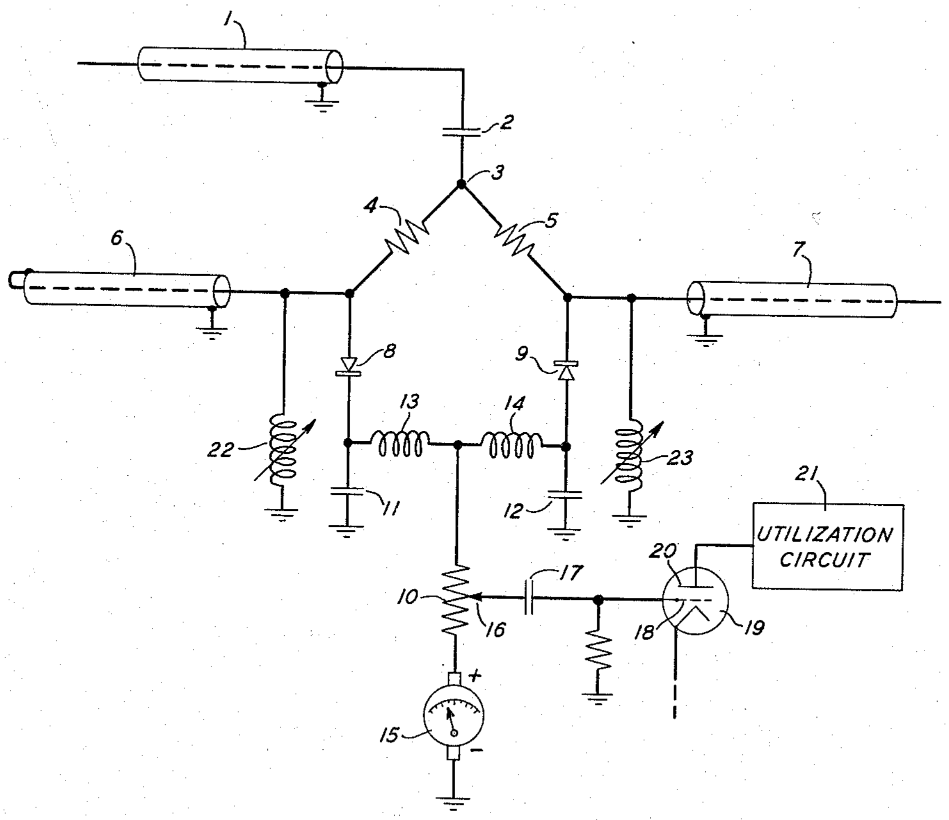
INVENTOR
U. S. BERGER
BY B. F. Stoddard
ATTORNEY Patented Dec. 29, 1953

2,664,505

UNITED STATES PATENT OFFICE 2,664,505

FREQUENCY MODULATION DETECTOR

Uriah S. Berger, Rockaway, N. J., assignor to Bell Telephone Laboratories, Incorporated, New York, N. Y., a corporation of New York Application July 26, 1951, Serial No. 238,672

5 Claims. (Cl. 250—27)

This invention relates to the detection of frequency-modulated electric signal waves and, more particularly, to a balanced discriminator network for detecting frequency-modulated high-frequency carrier waves having a wide frequency-deviation band.

Two of the most important requirements of such a discriminator network are that the operating characteristic of the discriminator should be linear and, secondly, that the discriminator network should produce zero current at the mid-frequency of the applied signal band. The first requirement is met when the operating characteristic of a discriminator network is essentially linear for the entire frequency range of the applied signal band and the second requirement is fulfilled when the polarity cross-over point of the operating characteristic corresponds with the mid-band frequency of the applied electric waves. A discriminator network meeting these requirements is disclosed in W. M. Goodall, Patent No. 2,576,833 issued November 27, 1951, which shows a network comprising inverse reactances differentially coupled by oppositely poled rectifiers to a single load resistor. Due to the fact that the resistance of the direct current return paths of these rectifiers is unequal, it is necessary in the Goodall discriminator to employ rectifiers having dissimilar rectifying efficiencies. This presents difficulties in the quantity manufacture of such discriminators because there is no reliable basis for selecting dissimilar rectifiers which, when combined in a discriminator network, will produce a slope characteristic having the required linearity and cross-over point.

Accordingly, it is an object of this invention to provide means for equalizing the resistance of the direct current return paths of the rectifiers employed in a discriminator network of the above-mentioned type in order to permit the use of rectifiers having equal rectifying characteristics.

An additional object is to improve the linearity of the operating characteristic of a discriminator network for use with frequency modulation signals having a wide frequency-deviation band.

A further object is to prove means for so adjusting such a discriminator network as to produce a zero current condition in its output circuit for an assigned frequency value of the applied electric waves thereby enabling the network to be used with signal bands having different mid-frequencies.

Another object is to provide means for balancing out stray capacitances in order to obtain a more perfect balance in a symmetrical discriminator network.

These and other objects of the invention are accomplished in a balanced discriminator network of the type disclosed in the above-mentioned Goodall application by connecting adjustable inductances across each of the oppositely poled rectifiers. Proper adjustment of these inductances increases the linearity of the operating characteristic of the discriminator over the frequency range of the applied signal band, produces a zero current condition in the output circuit at the mid-band frequency, and equalizes the resistance of the direct current return paths of the rectifiers thereby permitting the use of rectifiers having equal rectifying characteristics. This is more fully discussed in connection with the following detailed description of the drawing which is a schematic circuit diagram of a balanced discriminator network of the above-mentioned type embodying the present invention.

In the drawing, frequency-modulated high-frequency electric waves are applied to the left end of the coaxial transmission line 1 from any suitable source, such as conventional amplifying and limiting circuits of a radio receiver. As was stated above, the invention is particularly useful for detecting waves having a wide frequency-deviation band. From the right end of the coaxial line 1, the modulated signal waves are transmitted through a blocking condenser 2 to the junction point 3 where the network divides into two parallel branches or paths, each path including in series relation a resistor 4, 5, these resistors being of equal magnitude R and a reactor 6, 7.

The reactors 6, 7 are each constituted by a section of uniform coaxial transmission line having equal lengths. This length is $N\lambda/8$ where N is an odd integer and $\lambda$ is the wavelength at mid-band of waves traversing the line section. Such lines have low characteristic impedances and the energy dissipation in such lines is small. In one embodiment of the invention, good results were obtained when the value of N was 5. These reactors 6, 7 have inverse frequency characteristics because, as is indicated in the drawing, the line section 6 is short-circuited at its far end whereas the line section 7 is open-circuited at its far end. Due to the selected length of these line sections 6, 7, total reflection of the applied waves occurs in each line at its far end. Therefore, the line section 6 performs like an inductive reactance and retards the phase of the waves at its inner end by 45 degrees while the line section 7 acts like a capacitive reactance and advances the phase of the waves at its inner end by 45 degrees. These inverse reactors are designed to have respective magnitudes L and C, where the ratio $L/C=R^2$, and the circuit formed of the two parallel branches 4, 6, and 5, 7 have the configuration of a constant reactance network. In other words, the resistors 4, 5 and the reactors 6, 7 are so proportioned and related that when the two voltages across the reactances 6, 7 are equal, they are also equal to the voltages across the resistors 4, 5. This provides an input impedance for the discriminator network which is a constant resistance at all frequencies of the applied signal waves; that is, an impedance that is purely resistive and of magnitude independent of frequency.

Rectifying detectors 8 and 9 are reversely connected across respective reactances 6, 7 in polarity opposition so that their direct current outputs are subtracted in their common load resistor 10. The detectors 8, 9 may be of any suitable type, such as diode vacuum tubes or crystals of silicon or germanium. Good results have been obtained in one embodiment of the invention by using germanium crystal rectifiers. These rectifiers 8, 9 are grounded at radio frequencies by means of radio frequency capacitors 11 and 12. Further means for separating radio frequency currents from signal frequency currents comprise the radio frequency choke coils 13 and 14. A meter 15 is connected between the load resistor 10 and ground for measuring the resultant current of this discriminator network. The signal frequency currents are obtained from a tap 16 on the resistor 10 and are delivered through a blocking condenser 17 to the grid 18 of a signal frequency thermionic amplifier 19 having its anode 20 coupled to a utilization circuit 21.

As can be seen in the drawing, the direct current return paths of the oppositely poled rectifiers 8 and 9 are of unequal resistance and thereby presents difficulties in obtaining a proper balance of the parallel detecting paths which, in turn, renders it difficult to obtain linearity of the operating characteristic of the discriminator network throughout the entire frequency range of the applied signal band. This condition also makes it difficult to obtain zero current in the load resistor 10 at the center frequency of the applied band. Such linearity is particularly important in systems where very broad band signals are transmitted, such as in television or in multiplex telephone systems, and where correspondingly large frequency modulations or deviations are employed in transmitting the signals. In such systems, any lack of linearity results in the production of distortion components which in the case of multiplex telephony produces cross-talk between the several channels and in the case of television produces a deformation of the received picture.

In order to overcome these difficulties and to accomplish the objects of this invention, adjustable inductances 22 and 23 are connected across respective rectifiers 8 and 9. Proper adjustment of the inductors 22, 23 is obtained initially by applying to the input coaxial transmission line 1 electric wave energy of the same frequency as the mid-frequency of the assigned frequency band which is to be subsequently detected by the discriminator network. Next, the inductors 22 and 23 are adjusted until the meter 15 gives a zero reading. Then, when the desired signal-modulated carrier waves are subsequently applied to the input line 1, the discriminator network will produce zero current at the assigned mid-band frequency. With the impedance of the direct current return paths of the rectifiers 8, 9 thus equalized, it is possible to employ rectifiers having equal rectifying characteristics thereby greatly facilitating the quantity manufacture of these discriminator networks with substantially uniform operating characteristics.

Since this discriminator network is designed particularly for use with high-frequency waves, as was stated above, there are usually stray capacities associated with each of its parallel branches. In the branch containing the open-circuited line 7, these stray capacities add to the capacitive reactance constituted by the line section 7, but in the branch containing the short-circuited line 6 they subtract from the inductive reactance constituted by the line section 6. Such stray capacities can be effectively balanced out by proper adjustment of the inductors 22, 23 thereby providing a more perfect balance of the discriminator network and also improving the linearity of its operating characteristic throughout the assigned frequency band.

An important advantage of the discriminator network shown in the drawing is that it may be used with signal bands extending over different frequency ranges and having different mid-band frequencies. When the discriminator network is so used, the polarity cross-over point of its operating characteristic is changed to correspond with the mid-frequency of the particular band being detected by adjusting the inductors 22, 23 in conjunction with observations of the meter 15 in the manner described above. Thus, the cross-over point of this discriminator network can be readily varied or adjusted so as to produce zero current at the mid-frequency of a desired signal band. This also enables the network to be employed for automatic frequency control purposes by producing zero output for an assigned frequency value of the applied waves.

It is to be understood that this invention has been described above with reference to a specific discriminator network for the purpose of explaining its principles and features of operation and that the invention is not to be restricted to this particular embodiment but is to be limited only by the claims appended hereto.

What is claimed is:

1. A balanced discriminator network for detecting frequency-modulated high-frequency carrier waves having a wide frequency-deviation band, said discriminator network comprising two parallel paths each including in series a resistance and a distributed reactance, one of said distributed reactances having a frequency characteristic which is the inverse of that of the other reactance, said resistances and reactances being proportioned to provide an input impedance for said discriminator network that is a constant resistance at all frequencies of the applied waves, two rectifiers each connected across a different one of said reactances, an output circuit connected to said rectifiers, and control means for increasing the degree of linearity of the operating characteristic of said discriminator network and for producing a zero current condition in said output circuit when said applied waves are at mid-band frequency, said control means comprising two adjustable inductances each connected across a different one of said rectifiers.

2. In a receiver for frequency-modulated high-frequency carrier waves having a wide frequency deviation band, a balanced frequency-modulation discriminator network comprising parallel paths each including in series relation a resistor and a section of uniform transmission line of length equal to $N\lambda/8$ where N is an odd integer and $\lambda$ is the wavelength at mid-band of waves traversing the line section, said lines having short-circuit and open-circuit terminations respectively at their outer ends and having characteristic impedances so related to the resistances of said resistors as to make the combined impedance of the two paths a constant resistance, circuit means for impressing received waves between the outer terminals of said paths, rectifying detectors connected respectively across the input terminals of said lines and arranged in polarity opposition, an output circuit coupled to said rectifiers, and means for improving the balance of said discriminator network and for tuning out stray capacitances associated with said rectifying detectors, said means comprising adjustable inductances connected respectively between one end of each of said transmission lines and ground.

3. In a receiver for frequency-modulated high-frequency carrier waves having a wide frequency deviation band, a balanced frequency-modulation discriminator network comprising parallel paths each including in series relation a resistor and a section of uniform transmission line of length equal to $N\lambda/8$ where N is an odd integer and $\lambda$ is the wavelength at mid-band of waves traversing the line section, said lines having short-circuit and open-circuit terminations respectively at their outer ends and having characteristic impedances so related to the resistances of said resistors as to make the combined impedance of the two paths a constant resistance, circuit means for impressing received waves between the outer terminals of said paths, rectifying detectors connected respectively across the input terminals of said lines and arranged in polarity opposition, an output circuit coupled to said rectifiers, each of said rectifying detectors having equal rectifying characteristics, each of said detectors also having a direct current return path, said paths being unsymmetrical, and means for improving the balance of said discriminator network and for equalizing the resistance of said return paths, said means comprising an adjustable inductance connected in the return path of that detector which is connected across the input terminal of the transmission line having an open-circuit termination.

4. In combination, a source of frequency-modulated electric waves, a discriminator network for detecting said waves, said network having two parallel branches, a single input circuit connected between said source and each of said branches for applying said modulated waves thereto, two resistors of equal magnitude, two reactors of inverse frequency characteristics, one of said resistors and one of said reactors being connected in series relation in one of said branches and the other of said resistors and the other of said reactors being connected in series relation in the other of said branches, a resistance, two rectifiers each connected across a respectively different one of said reactors and both connected to said resistance in polarity opposition, and control means for adjusting the polarity cross-over point of the operating characteristic of said discriminator network to correspond with a desired frequency of the applied waves, said control means comprising two adjustable inductances and circuit means for connecting each of said inductances across a respectively different one of said rectifiers.

5. In combination, a source of electric wave energy having frequencies distributed throughout an assigned band, a load resistor, and a network interconnecting said source and said load resistor for effecting the production of a zero current condition in said load resistor in response to the application thereto of energy of a selected frequency within said band, said network comprising two parallel branches each having a resistor and a reactor connected therein in series relation, the reactor in one of said branches having a frequency characteristic which is the inverse of that of the reactor in the other of said branches, two rectifiers each connected across a different one of said reactors in polarity opposition, said rectifiers having unsymmetrical direct current paths, and adjusting means for adjusting the impedance of said paths, said means comprising two adjustable inductances and connecting means for connecting one of said inductances across one of said rectifiers and for connecting the other inductance across the other rectifier.

URIAH S. BERGER.

References Cited in the file of this patent

UNITED STATES PATENTS

| Number | Name | Date |
|---|---|---|
| 2,286,378 | Roberts | June 16, 1942 |
| 2,410,006 | Blitz | Oct. 29, 1946 |
| 2,457,013 | Usselman | Dec. 21, 1948 |
| 2,478,023 | Summerhayes et al. | Aug. 2, 1949 |
| 2,576,833 | Goodall | Nov. 27, 1951 |

FOREIGN PATENTS

| Number | Country | Date |
|---|---|---|
| 641,916 | Great Britain | Aug. 23, 1950 |